United States Patent
Arakawa

(10) Patent No.: US 8,136,390 B2
(45) Date of Patent: Mar. 20, 2012

(54) ENGINE MISFIRE DIAGNOSTIC APPARATUS AND METHOD

(75) Inventor: Hiroshi Arakawa, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 118 days.

(21) Appl. No.: 12/811,505

(22) PCT Filed: Mar. 2, 2009

(86) PCT No.: PCT/IB2009/000405
§ 371 (c)(1),
(2), (4) Date: Jul. 1, 2010

(87) PCT Pub. No.: WO2009/112911
PCT Pub. Date: Sep. 17, 2009

(65) Prior Publication Data
US 2010/0288035 A1    Nov. 18, 2010

(30) Foreign Application Priority Data
Mar. 11, 2008   (JP) ................................. 2008-061405

(51) Int. Cl.
*G01M 15/11* (2006.01)
(52) U.S. Cl. ................................... 73/114.03; 73/114.02
(58) Field of Classification Search ... 73/114.02–114.05
See application file for complete search history.

(56) References Cited

U.S. PATENT DOCUMENTS

| | | | | |
|---|---|---|---|---|
| 5,497,328 A | * | 3/1996 | Sugai et al. | 701/101 |
| 5,544,058 A | * | 8/1996 | Demizu et al. | 701/29 |
| 5,728,941 A | * | 3/1998 | Yamamoto et al. | 73/114.04 |
| 5,747,679 A | * | 5/1998 | Dietz et al. | 73/114.03 |
| 6,023,651 A | * | 2/2000 | Nakayama et al. | 701/110 |
| 7,197,916 B2 | * | 4/2007 | Matsumoto et al. | 73/114.04 |
| 7,353,803 B2 | * | 4/2008 | Mathews et al. | 123/406.18 |
| 7,359,793 B2 | * | 4/2008 | Galtier et al. | 701/111 |
| 7,530,261 B2 | * | 5/2009 | Walters | 73/114.04 |

FOREIGN PATENT DOCUMENTS

| | | |
|---|---|---|
| JP | H8-144837 A | 6/1996 |
| JP | H8-261054 A | 10/1996 |
| JP | 2006-9746 A | 1/2006 |
| JP | 2006-132334 A | 5/2006 |
| JP | 2007-2711 A | 1/2007 |

OTHER PUBLICATIONS

Extended International Search Report of the corresponding International Application No. PCT/IB2009/000405.

* cited by examiner

*Primary Examiner* — Freddie Kirkland, III
(74) *Attorney, Agent, or Firm* — Global IP Counselors, LLP

(57) ABSTRACT

An engine misfire diagnostic apparatus measures an amount of time required for a crankshaft to pass through a prescribed crank angle range corresponding to a combustion stroke to obtain time measurement values on a per cylinder basis. A first misfire parameter is obtained based on stored time measurement values from a designated cylinder, an opposing cylinder corresponding to one crankshaft rotation prior and the opposing cylinder corresponding to one crankshaft rotation later. A second misfire parameter is obtained based on stored time measurement values from the designated cylinder, a first reference cylinder whose ignition occurs one ignition prior to the designated cylinder's ignition and a second reference cylinder whose ignition occurs later than the designated cylinder's ignition, the differences weighted according to a prescribed ratio. A determination of whether the designated cylinder has misfired is based on the second misfire parameter and a derivative value of the first misfire parameter.

16 Claims, 11 Drawing Sheets

ENGINE MISFIRE DIAGNOSTIC APPARATUS AND METHOD

CROSS-REFERENCE TO RELATED APPLICATIONS

This U.S. National stage application claims priority to Japanese Patent Application No. 2008-061405, filed on Mar. 11, 2008. The entire disclosure of Japanese Patent Application No. 2008-061405 is hereby incorporated herein by reference.

BACKGROUND

1. Field of the Invention

The present invention generally relates to an engine misfire diagnostic apparatus and method for diagnosing an engine misfire.

2. Background Information

There is an existing engine misfire diagnostic apparatus contrived to measure an amount of time required for a crankshaft of an engine to pass through a prescribed crank angle range corresponding to a combustion stroke on a per-cylinder basis based a signal from a sensor contrived to detect a rotational position of the crankshaft, store the time measurement value measured on a per-cylinder basis during each ignition, calculate a misfire parameter based on the stored time measurement values, and determine if a cylinder misfired by comparing the misfire parameter to a misfire determination threshold value (e.g., Japanese Laid-Open Patent Publication No. 9-32625).

SUMMARY

It has been discovered that due to external disturbances imparted to the output shaft of the engine, there are situations in which the time measurement values described above vary and cause the waveform of the misfire parameter to become distorted. Consequently, using the technology described in Japanese Laid-Open Patent Publication No. 9-32625 as is may result in an erroneous misfire determination. In a vehicle provided with an engine as a drive source, external disturbances are imparted to the output shaft of the engine because the engine output is transmitted to a wheel of the vehicle through a transmission and the drivetrain components. For example, in a vehicle having a damper mechanism between the engine and the drivetrain (e.g., a vehicle having a manual transmission or a hybrid vehicle), the damper mechanism causes a reaction torque corresponding to a rotational acceleration to be borne by the engine output shaft due. Since a sensor is provided on the engine output shaft to detect a rotational position of the engine output shaft (crankshaft), when a reaction torque is imparted to the engine output shaft, the aforementioned time measurement value, which is measured based on a signal from the sensor, changes and disturbs the waveform of the misfire parameter. Even in a vehicle that does not have a damper mechanism between the engine and the drivetrain, the time measurement values can change and the waveform of the misfire parameter can be disturbed when the rotational speed of the engine output shaft (crankshaft) fluctuates due to an external disturbance, such as a poor road surface. Obviously, a misfire determination threshold value that is appropriate when the waveform of the misfire parameter is disturbed due to an external disturbance imparted to the engine output shaft will be different than a misfire determination threshold value that is appropriate when an external disturbance is not imparted to the engine output shaft. Consequently, an erroneous determination will likely occur if the same misfire determination threshold value is used when the waveform of the misfire parameter is disturbed due to an external disturbance imparted to the engine output shaft as when an external disturbance is not imparted to the engine output shaft.

In view of the state of the conventional technology, one object of the present invention is to provide a diagnostic apparatus and diagnostic method that can accurately determine if a cylinder has misfired even when the waveform of the misfire parameter is disturbed due to an external disturbance imparted to the engine output shaft.

In order to achieve the object, an engine misfire diagnostic apparatus is provided that basically comprises a sensor, a time measuring section, a time measurement value storing section, a first misfire parameter calculating section, a second misfire parameter calculating section, a determination value setting section and a misfire determining section. The sensor is arranged to detect a rotational position of a crankshaft provided in an engine. The time measuring section measures an amount of time required for a crankshaft to pass through a prescribed crank angle range corresponding to a combustion stroke based on a signal from the sensor to obtain time measurement values on a per cylinder basis. The time measurement value storing section stores the time measurement values measured by the time measuring section for each ignition on a per-cylinder basis. The first misfire parameter calculating section calculates a first misfire parameter based on a first value obtained by adding a difference between a stored time measurement value for a designated cylinder and a stored time measurement value for an opposing cylinder corresponding to one crankshaft rotation prior and a difference between the stored time measurement value for the designated cylinder and a stored time measurement value for the opposing cylinder corresponding to one crankshaft rotation later with respect to the one crankshaft prior of the opposing cylinder. The second misfire parameter calculating section calculates a second misfire parameter based on a second value obtained by adding a difference between the stored time measurement value for the designated cylinder and a stored time measurement value of a first reference cylinder whose ignition occurs one ignition prior to an ignition of the designated cylinder and a difference between the stored time measurement value of the designated cylinder and a stored time measurement value of a second reference cylinder whose ignition occurs later than the ignition of the designated cylinder, the differences being weighted according to a prescribed ratio. The determination value setting section sets a determination value using a mathematical relationship between the second misfire parameter and a derivative value of the first misfire parameter. The misfire determining section determines whether a cylinder-in-question has misfired based on the determination value.

These and other objects, features, aspects and advantages of the present invention will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
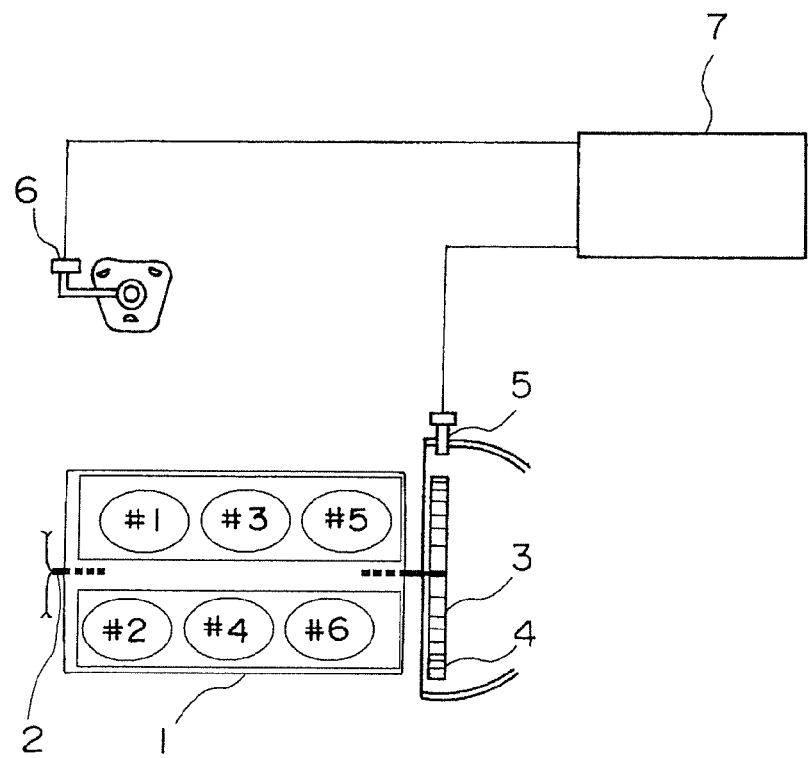
FIG. 1 is a simplified schematic view of an engine misfire diagnostic apparatus according to one embodiment.

Referring initially to FIG. 1, an engine misfire diagnostic apparatus is schematically illustrated in accordance with one embodiment. The engine misfire diagnostic apparatus is designed to accomplish an accurate misfire determination even when a waveform of a misfire parameter is affected (distorted) by an external disturbance. FIG. 1 shows an engine main body 1 with a crankshaft 2 (engine output shaft), a flywheel 3 and a ring gear 4. The flywheel 3 is provided on an end of the crankshaft 2. The ring gear 4 is formed on an external circumference of the flywheel 3. The engine misfire diagnostic apparatus is provided with a magnetic pickup 5, a crank angle sensor 6 and an engine control unit 7. The magnetic pickup 5 forms a sensor that is arranged to detect a rotational position of the crankshaft 2. The magnetic pickup 5 (sensor) is arranged to face toward the teeth of the ring gear 4. The pickup 5 comprises an iron core and a coil. As the crankshaft 2 rotates, the teeth of the ring gear 4 cause a magnetic field occurring in the iron core of the magnetic pickup 5 to be intermittently interrupted. Consequently, a magnetic force acting on the coil of the magnetic pickup 5 changes and causes an alternating current to be induced. The alternating current (AC signal) is converted into a square-wave ON-OFF pulse (ring gear position signal) by an engine control unit 7 and used as a crank angle signal.

In addition, the present embodiment may be illustrated by providing, for example, a V6 cylinder engine. In the Figures, references #1, #2, and so on indicate each cylinder of the engine, as well as the order of combustion of each cylinder, and each cylinder of the bank is alternately exploded from a first end side of crankshaft axle direction in the order of cylinders #1-#2-#3-#4-#5-#6. Of course, the present invention is not limited to V6 cylinder engines but could, for example, be used with a 4 cylinder engine.

The crank angle sensor 6 is a conventional sensor that is provided on a camshaft (not shown), which is driven by the crankshaft 2. The crank angle sensor 6 outputs a reference signal (Ref signal) and a position signal (1-deg signal), which are sent from the sensor 6 to the engine control unit 7.

Figure 2:
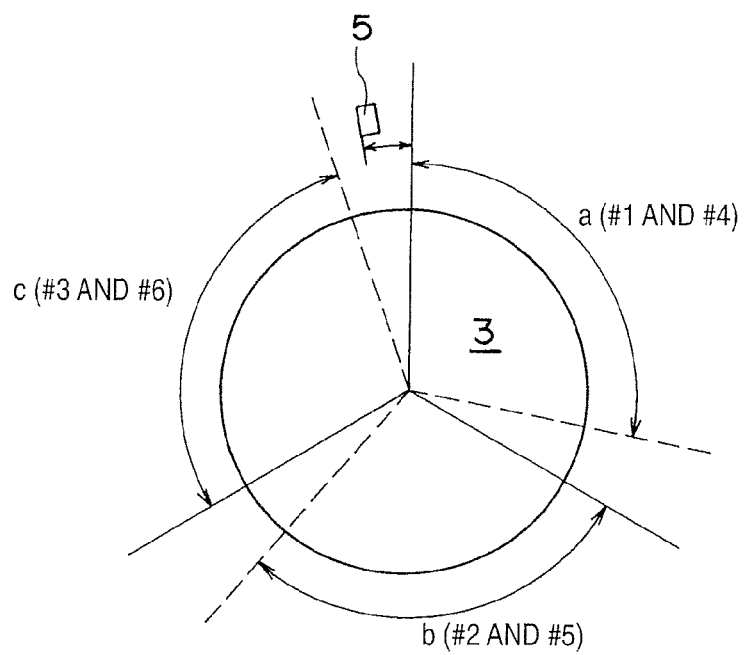
FIG. 2 is a diagram illustrating the angular ranges a, b and c of the ring gear that are measured.

The engine control unit 7 counts a prescribed number of pulses (pulses obtained from the magnetic pickup 5) after receiving the Ref signal for a first cylinder from the crank angle sensor 6. Then, using the point in time at which it finishes counting the prescribed number of pulses as a reference, the engine control unit 7 samples an amount of time TINT, which is required for the crankshaft 2 to pass through a prescribed crank angle range. As shown in FIG. 2, the engine control unit 7 preferably samples the time TINT three times per a single rotation of the crankshaft 2. Using the sampling values, it executes a misfire determination.

Since it is necessary to distinguish among the time measurement values TINT of the respective crank angle ranges, the time measurement values TINT (measured time required for the crankshaft to pass through each crank angle range) are designated as TINT1, TINT2, . . . , TINT7 in order from the latest measurement value.

When, as shown in FIG. 2, the engine is a six cylinder V-type engine having a firing order of 1-2-3-4-5-6, the range "a" corresponds to the combustion stroke of the first and fourth cylinders, the range "b" corresponds to the combustion stroke of the second and fifth cylinders, and the range "c" corresponds to the combustion stroke of the third to sixth cylinders.

Figure 3A:
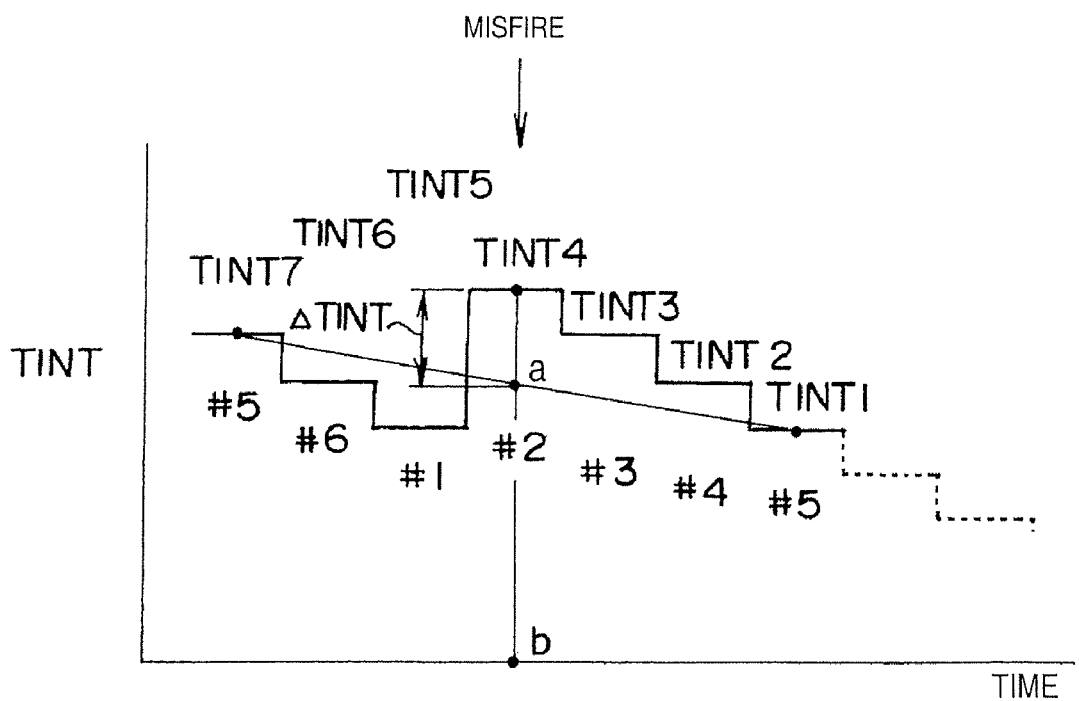
FIG. 3A is a waveform diagram illustrating a calculation of the first misfire parameter MISB for cylinder #2.
Figure 3B:
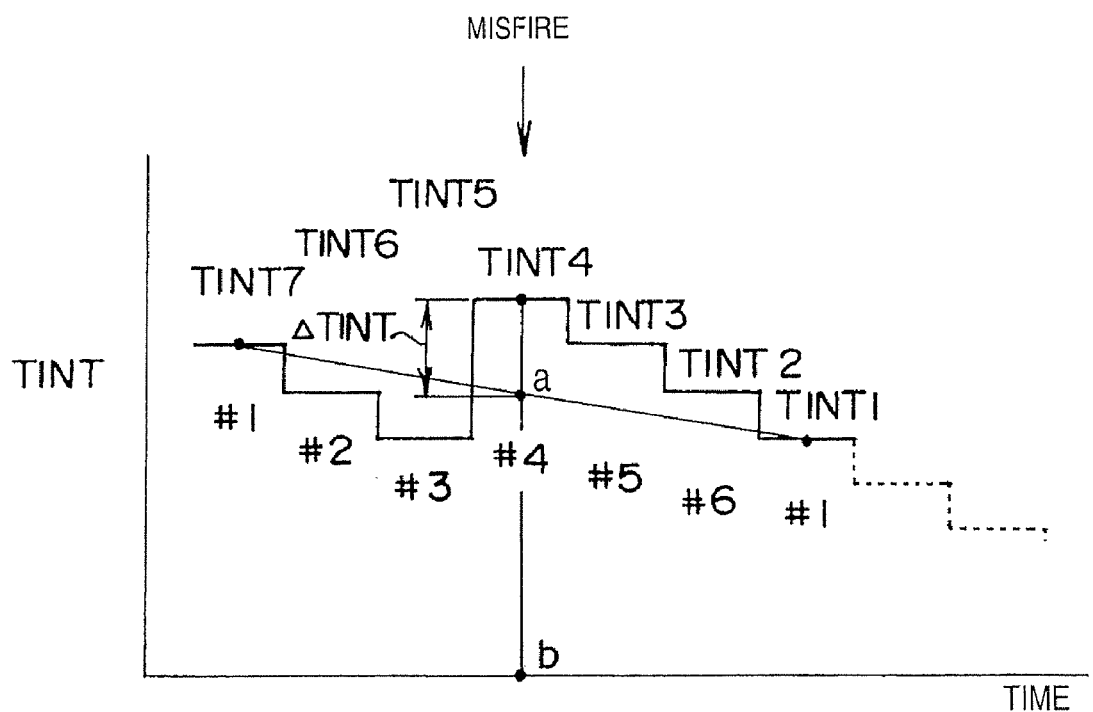
FIG. 3B is a waveform diagram illustrating a calculation of the first misfire parameter MISB for cylinder #4.
Figure 4A:
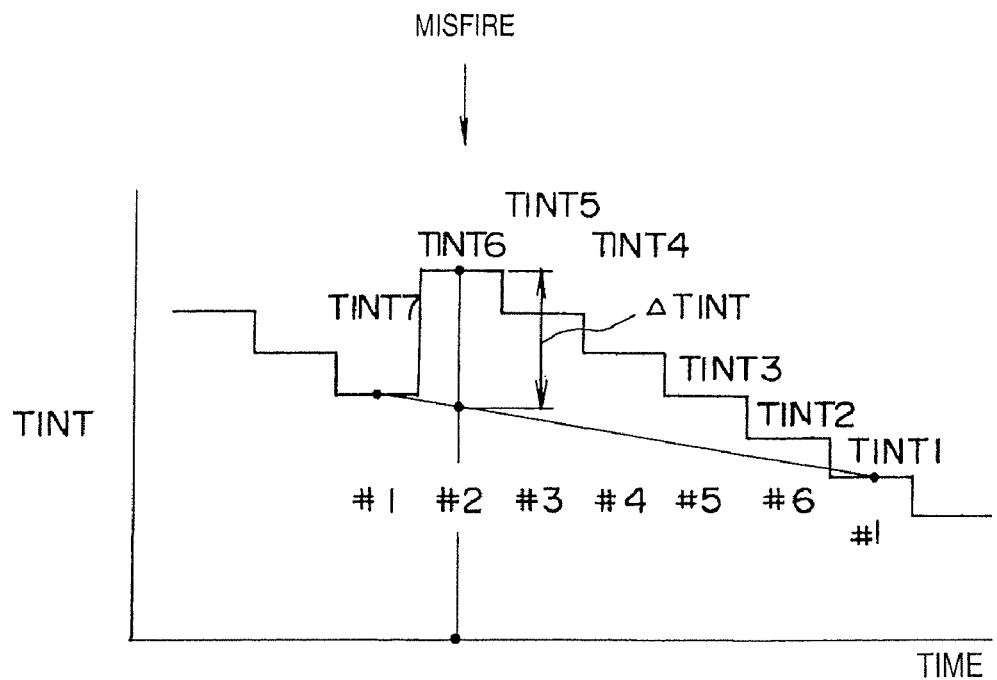
FIG. 4A is a waveform diagram illustrating a calculation of the second misfire parameter MISA for cylinder #2.
Figure 4B:
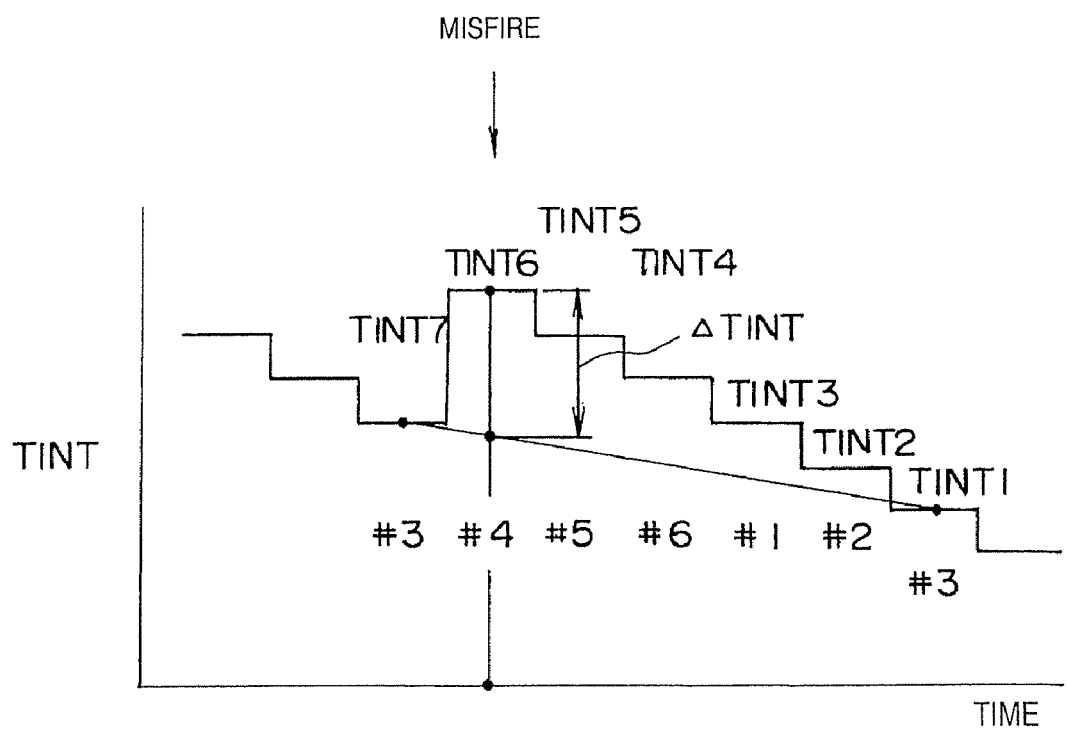
FIG. 4B is a waveform diagram illustrating a calculation of the second misfire parameter MISA for cylinder #4.

A misfire determination conducted based on the time measurement values TINT will now be explained briefly (see, for example, Japanese Laid-Open Patent Publication No. 9-32625 for more detail on the time measurement values). As used herein, the term "designated cylinder" refers to the cylinder for which a misfire is currently being determined. Two examples will now be discussed with reference to FIGS. 3A, 3B, 4A and 4B. FIGS. 3A and 4A refer to the second cylinder as the designated cylinder, while FIGS. 3B and 4B refer to the fourth cylinder as the designated cylinder. In particular, FIG. 3A is diagrammatically showing how a first misfire parameter is calculated when the second cylinder is the designated cylinder, while FIG. 3B diagrammatically showing how the first misfire parameter is calculated when the fourth cylinder is the designated cylinder. FIG. 4A is diagrammatically showing how a second misfire parameter is calculated when the second cylinder is the designated cylinder, while FIG. 4B diagrammatically showing how the second misfire parameter is calculated when the fourth cylinder is the designated cylinder. FIGS. 3A and 4A are sequential graphs of a crank rotation taken at different periods of time in which both graphs are showing the same misfiring of the second cylinder in the same crank rotation. FIGS. 3B and 4B are sequential graphs of a crank rotation taken at different periods of time in which both graphs are showing the same misfiring of the fourth cylinder in the same crank rotation.

FIG. 3A illustrates a waveform occurring when the second cylinder misfires during acceleration of the vehicle. As mentioned above, in this case, the second cylinder is the designated cylinder, which happens to be misfiring in this example. The misfire causes the time measurement value of the second cylinder to be larger, creating a jump in the vicinity of the second cylinder. Since time measurements of the fifth cylinder and the second cylinder are made using the same tooth position of the ring gear, it can be assumed that a time increase $\Delta$TINT is caused by a misfire, where the time increase $\Delta$TINT corresponds to an amount by which the time measurement value TINT of the misfired cylinder (second cylinder) protrudes above a diagonal line joining a time measurement value TINT of an opposing cylinder (fifth cylinder) corresponding to one engine rotation prior and a time measurement value TINT of the opposing cylinder (fifth cylinder) corresponding to one crankshaft rotation later. The time increase $\Delta$TINT, shown in FIG. 3A, is calculated using the equation (1) below by executing a graphic processing (e.g., subtracting the distance between points "a" and "b" from the time measurement value TINT4). In this equation (1), the equation ends by dividing by the number of cylinders, e.g., six in the illustrated example.

$$\Delta TINT = [3(TINT4-TINT7)+3(TINT4-TINT1)]/6 \quad (1)$$

A misfire parameter MISB (hereinafter called the "first misfire parameter") for opposing cylinders (i.e., cylinders for which the time measurement is made at the same tooth position of the ring gear, such as the second and fifth cylinders or the first and fourth cylinders) is then defined as shown in the equation below.

$$MISB = 6 \times \Delta TINT/(TINT7)^3 \quad (2)$$

Therefore, the first misfire parameter MISB can ultimately be obtained using the following equation.

$$MISB = [3(TINT4-TINT7)+3(TINT4-TINT1)]/(TINT7)^3 \quad (3)$$

The first misfire parameter MISB can also be obtained using the following equation.

$$MISB = 3[(TINT4-TINT7)+(TINT4-TINT1)]/(TINT7)^3 \quad (3a)$$

The increase $\Delta$TINT of the time measurement value accompanying the misfire has the following relationship with respect to a generated torque and an engine rotational speed.

$$\Delta TINT \propto \text{generated torque}/(\text{engine rotational speed})^3 \quad (4a)$$

Since the engine rotational speed and the time measurement value TINT are inversely proportional, the following relationship also exists.

$$\text{Generated torque} \propto \Delta TINT \times (\text{engine rotational speed})^3 = \Delta TINT/TINT^3 \quad (4b)$$

Thus, based on the equations (2) and (4b), it can be seen that the first misfire parameter MISB is a value that physically corresponds to a torque (the same holds for another misfire parameter described later).

The first misfire parameter MISB increases when the second cylinder misfires and the time measurement value TINT4 increases as shown in FIG. 3A. Therefore, it can be determined that a misfire has occurred when the first misfire parameter MISB is equal to or larger than a determination value. Since the same tooth position of the ring gear is used when conducting a misfire determination using the first misfire parameter MISB, a misfire determination conducted using the first misfire parameter MISB is not affected by variations in the shape of the ring gear.

In the same way, the existence of a misfire can be determined when the fourth cylinder misfires, as shown in FIG. 3B. In that case, the fourth cylinder would be known as the designated cylinder, which happens to be misfiring in this example. In the case of the fourth cylinder being the designated cylinder. The misfire causes the time measurement value of the fourth cylinder to be larger, creating a jump in the vicinity of the fourth cylinder. Since time measurements of the first cylinder and the fourth cylinder are made using the same tooth position of the ring gear, it can be assumed that a time increase $\Delta$TINT is caused by a misfire, where the time increase $\Delta$TINT corresponds to an amount by which the time measurement value TINT of the misfired cylinder (fourth cylinder) protrudes above a diagonal line joining a time measurement value TINT of an opposing cylinder (first cylinder) corresponding to one engine rotation prior and a time measurement value TINT of the opposing cylinder (first cylinder) corresponding to one crankshaft rotation later.

However, in the case of the second cylinder being the designated cylinder (FIG. 3A), if both the fifth cylinder and the second cylinder misfire in succession, the time measurement values TINT1, TINT4, and TINT7 will all increase in a similar manner and the time increase amount $\Delta$TINT will be approximately zero ($\Delta$TINT$\approx$0). Consequently, the first misfire parameter will be approximately zero and it will be necessary to consider another misfire parameter in the case of the second cylinder being the designated cylinder (FIG. 3A). Similarly, in the case of the fourth cylinder being the designated cylinder (FIG. 3B), if both the first cylinder and the fourth cylinder misfire in succession, the time measurement values TINT1, TINT4, and TINT7 will all increase in a similar manner and the time increase amount $\Delta$TINT will be approximately zero ($\Delta$TINT$\approx$0). Consequently, the first misfire parameter will be approximately zero and it will be necessary to consider another misfire parameter in the case of the fourth cylinder being the designated cylinder (FIG. 3A).

Now, the second misfire parameter will now be explained with reference to FIGS. 4A and 4B. FIG. 4A refers to the second cylinder as the designated cylinder, while FIG. 4B refers to the fourth cylinder as the designated cylinder. In particular, FIG. 4A is diagrammatically showing how the second misfire parameter is calculated when the second cylinder is the designated cylinder, while FIG. 4B diagrammatically showing how the second misfire parameter is calculated when the fourth cylinder is the designated cylinder.

Now consider a situation in which the second cylinder misfires, and the second cylinder is the designated cylinder. A time increase $\Delta$TINT caused by the misfire can be calculated based on the difference between the time measurement values of a cylinder (known as the first reference cylinder) whose ignition occurs one ignition prior (i.e., immediately prior) to the ignition of the misfired cylinder (the designated cylinder), and based on the difference between the time measurement values of a cylinder (known as the second reference cylinder) whose ignition occurs later than the ignition of the misfired cylinder. In the illustrated embodiment, the first and second reference cylinders are the same cylinder within two distinct crank rotations. The time increase $\Delta$TINT can then be calculated by executing a graphic processing and using the equation below, taking into consideration the number of cylinders and a comparison of the ignition intervals corresponding to the prior adjoining cylinder within two distinct crank rotations.

$$\Delta TINT = [5(TINT6-TINT7)+1(TINT6-TINT1)]/6 \quad (5)$$

Another misfire parameter MISA can then be defined as shown in the equation below.

$$MISA = 6 \times \Delta TINT/(TINT7)^3 \quad (6)$$

Therefore, the misfire parameter MISA (hereinafter called the "second misfire parameter") can ultimately be obtained using the following equation.

$$MISA = [5(TINT6-TINT7) + 1 \times (TINT6-TINT1)] / (TINT7)^3 \quad (7)$$

With the second misfire parameter MISA obtained as just described, even if two opposing cylinders whose time measurement values are measured at the same tooth position of the ring gear (e.g., the second and fifth cylinders or the first and fourth cylinders) misfire in succession, the misfires can be detected based on the second misfire parameter MISA becoming equal to or larger than a determination value. In the same way, the second misfire parameter can be determined as shown in FIG. 4B when the fourth cylinder misfires and is the designated cylinder.

Figure 5:
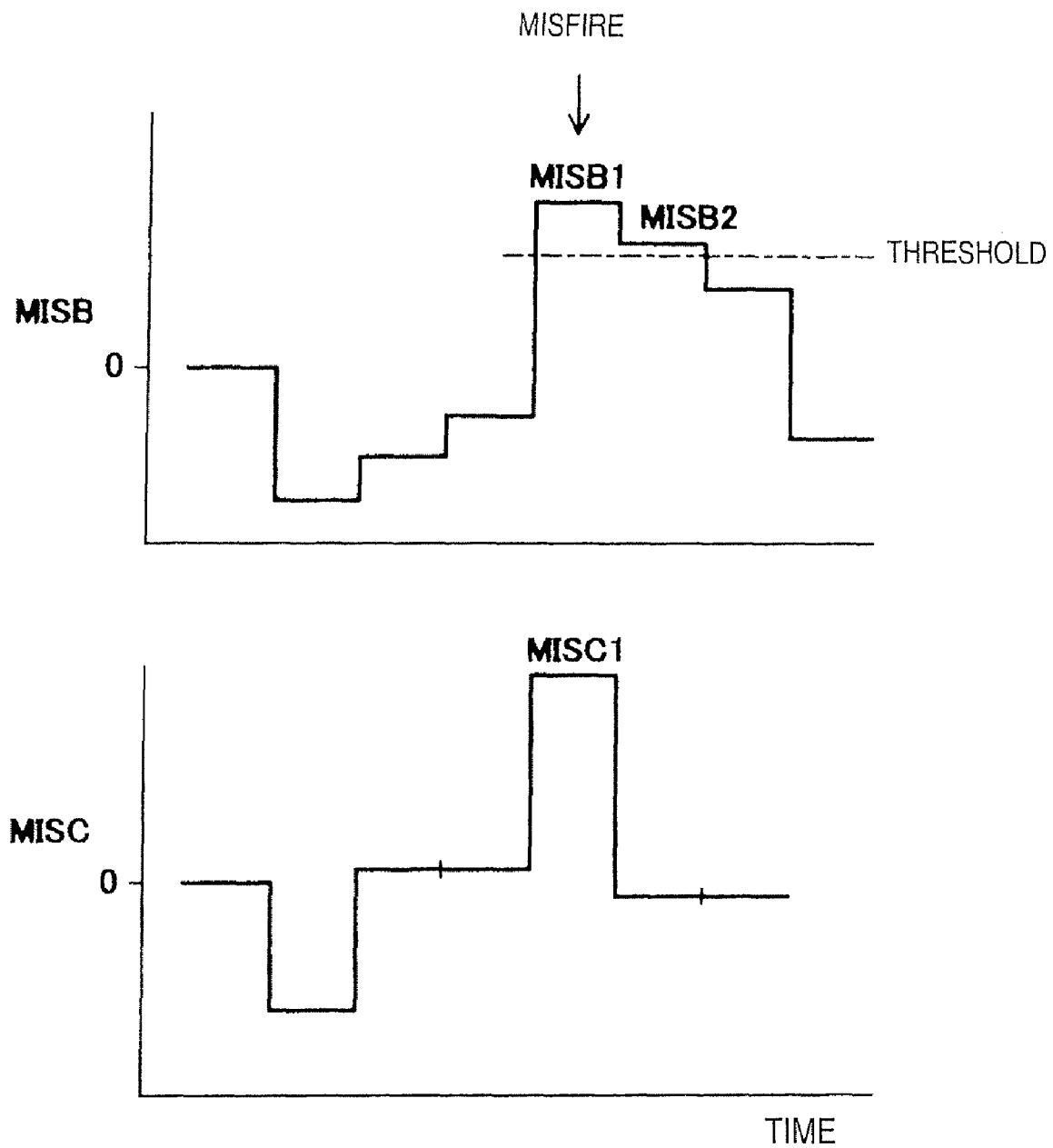
FIG. 5 shows waveform diagrams of the first misfire parameter MISB and the third misfire parameter MISC.

As shown in the upper graph of FIG. 5, not only does the value of the first misfire parameter MISB increase when a misfire occurs, but the value remains high one or two ignitions after the misfire. Consequently, if, for example, the determination value (misfire determination threshold value) is set at the position shown in the upper graph of FIG. 5, then there will be the possibility that the apparatus will incorrectly determine that the same cylinder misfired twice in succession even though it actually only misfired once.

Therefore, still another misfire parameter MISC is defined as shown in the equation below. The value MISC corresponds physically to a derivative value of the first misfire parameter MISB and is hereinafter referred to as a "third misfire parameter." In the equation, MISB1 is the value of the current MISB and MISB2 is the value of the immediately previous MISB.

$$MISC = MISB1 - <MISB2 \quad (8)$$

As shown in the lower graph of FIG. 5, the third misfire parameter MISC only increases when a misfire occurs. Thus, by using the third misfire parameter MISC instead of the first misfire parameter MISB, an incorrect determination can be avoided.

Figure 6:
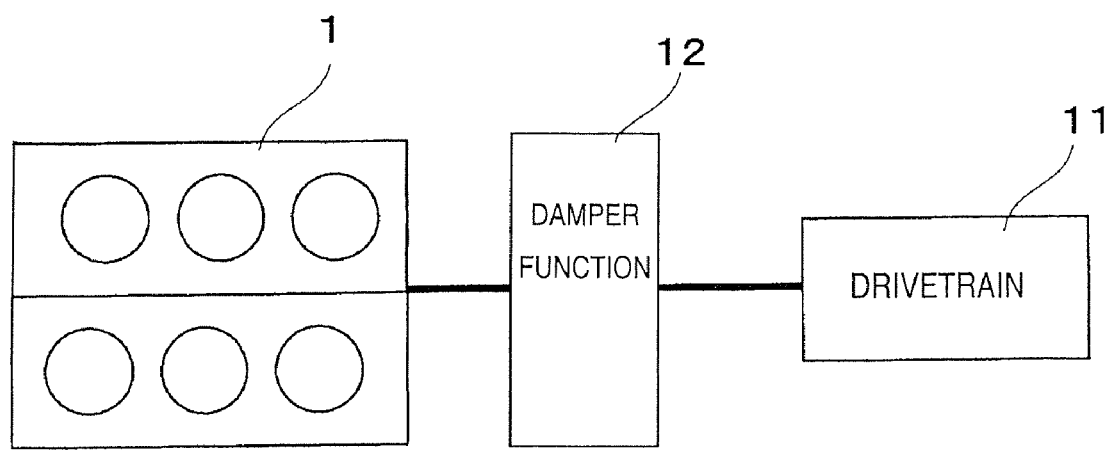
FIG. 6 is a block diagram of a vehicle having a damper mechanism between the engine and the drivetrain.

In some vehicles, a torsional damper mechanism is provided in the transmission connected to the engine. The torsional damper mechanism serves to absorb and alleviate torque fluctuations occurring in the engine while the engine is running. Even in vehicles having an automatic transmission and a torque converter having an excellent torque fluctuation absorbing ability provided in the power transmission path, a torsional damper mechanism is sometimes installed in a lockup mechanism that serves to put the torque converter into a locked-up state in which the input and output elements of the torque converter are connected directly together. Such a damper mechanism is depicted in FIG. 6 as a damper mechanism 12 arranged between the engine 1 and a drivetrain 11. The damper mechanism is described in more detail in Japanese Laid-Open Patent Publication No. 2002-340093. An explanation of the damper mechanism itself is omitted here.

In a vehicle having a damper mechanism 12 between the engine 1 and the drivetrain 11 (e.g., a vehicle having a manual transmission or a hybrid vehicle), the damper mechanism 12 causes a reaction torque corresponding to a rotational acceleration to be imparted to the output shaft (crankshaft 2) of the engine 1. Since the magnetic pickup 5 is provided on the crankshaft 2 (ring gear 4), when a reaction torque is imparted to the crankshaft 2, the aforementioned time measurement value, which is measured based on a signal from the magnetic pickup 5, changes and disturbs the waveform of the misfire parameter.

Figure 7:
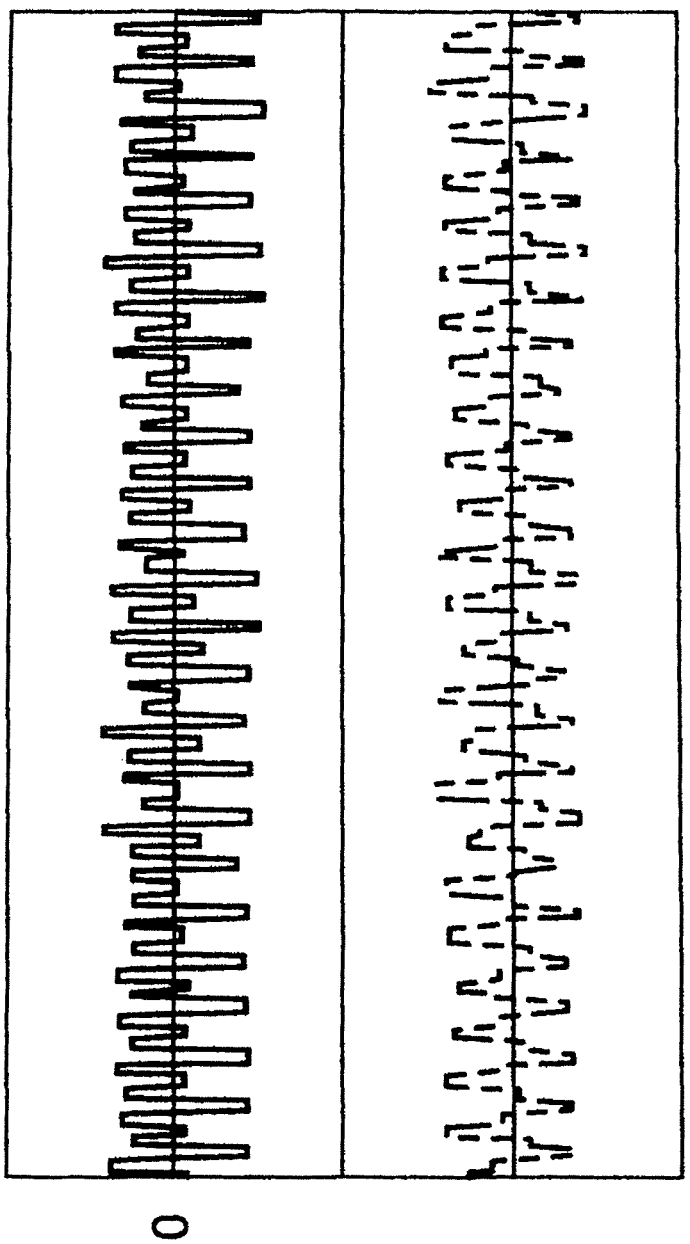
FIG. 7 is a waveform diagram of the second and third misfire parameters MISA and MISC corresponding to a situation in which a cylinder has misfired while an external disturbance was being imparted to an output shaft of the engine.
Figure 8:
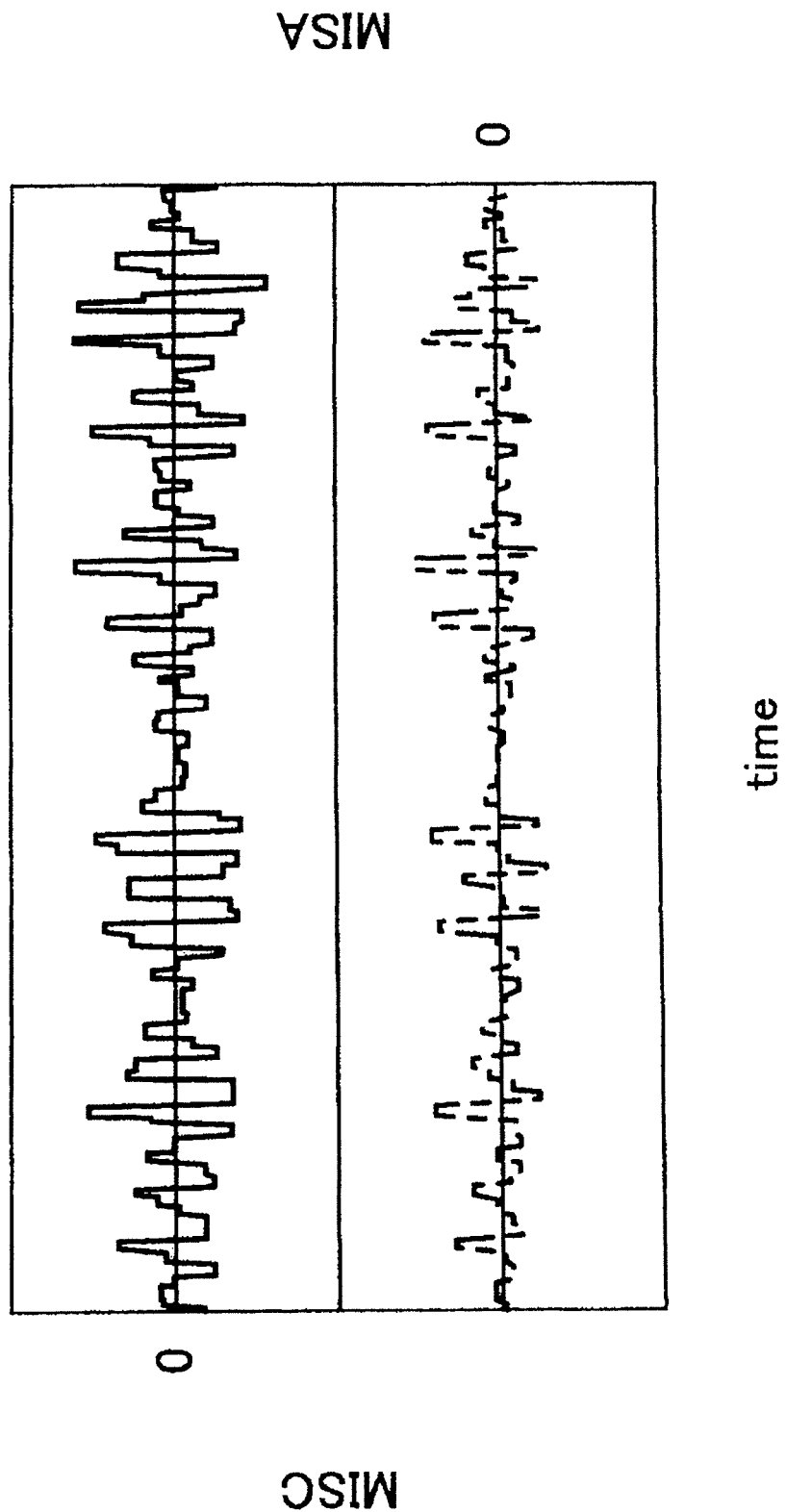
FIG. 8 is a waveform diagram of the second and third misfire parameters MISA and MISC corresponding to a situation in which misfiring is not occurring and an external disturbance is being imparted to the output shaft of the engine.

For example, depending on the damping characteristic of the damper mechanism 12, the time measurement values may peak at a time different from the actual time when a misfire occurs and/or the peak value may be small. Consequently, the peak resulting from the misfire may not be clearly detectable and the time measurement values measured after the misfire may not be detected accurately, making it difficult to determine the peak value of the time measurement values resulting from the misfire (see FIG. 7). Meanwhile, an engine torque fluctuation (engine rotational speed fluctuation) that occurs when the engine is not misfiring can cause the time measurement values (and thus the second and third misfire parameters MISA and MISC) to fluctuate greatly due to the influence of the damper mechanism 12 (see FIG. 8).

In order to learn the relationship that exists among the second misfire parameter MISA, the third misfire parameter MISC, and the misfire determination result, a sampling of the second misfire parameter MISA, the third misfire parameter MISC, and the misfire determination result was conducted with respect to each cylinder of the engine 1 with the engine 1 running under constant operating conditions, i.e., a prescribed engine load and a prescribed engine rotational speed. The engine 1 was installed in a vehicle having a damper mechanism between the engine 1 and the drivetrain. Pairs of the two misfire parameters MISA and MISC obtained for each cylinder during the sampling were used as coordinates and plotted on a graph constructed such that values of the third misfire parameter MISC are indicated on a horizontal axis and the values of the second misfire parameter MISA are indicated on a vertical axis. The graph is shown in FIG. 9.

Figure 9:
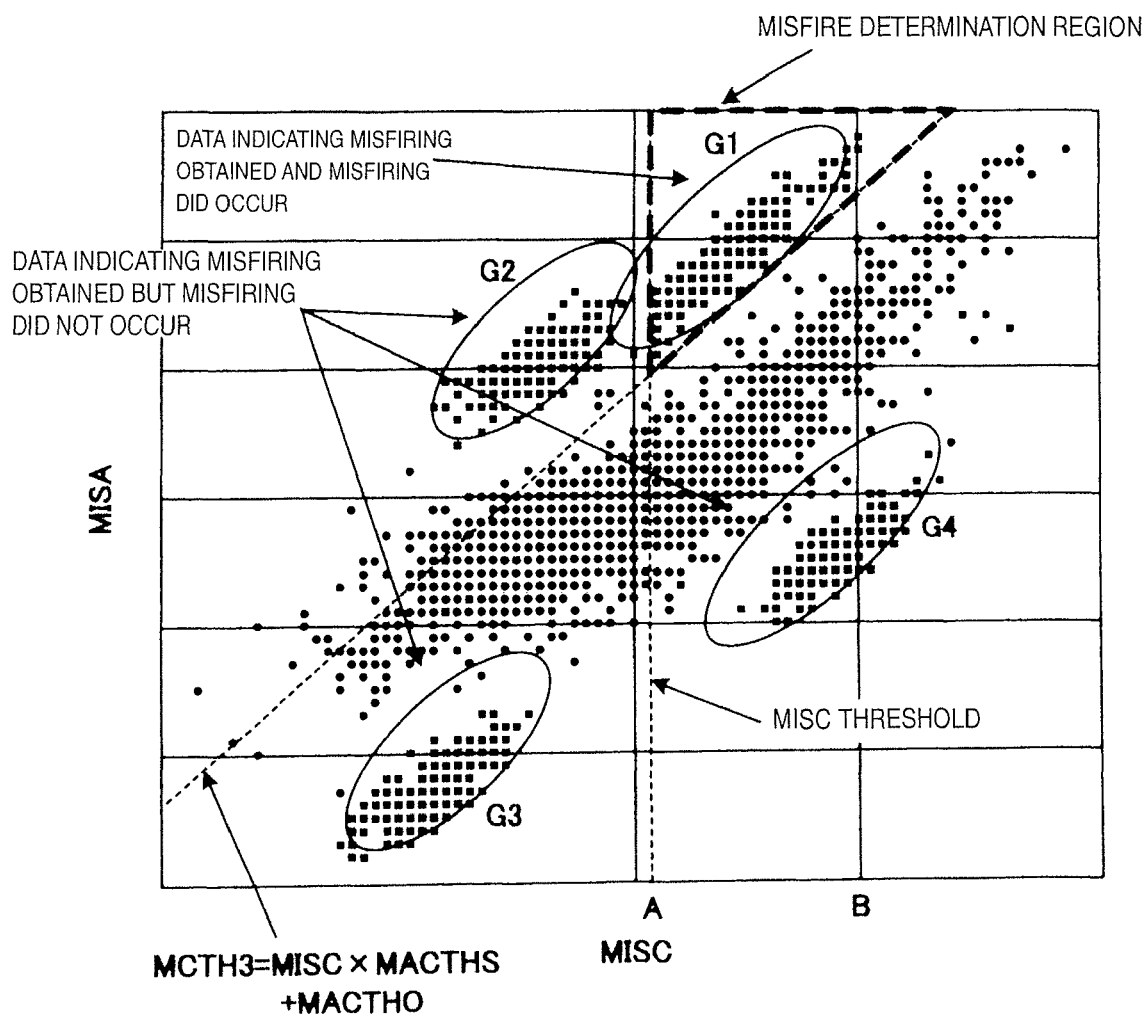
FIG. 9 is a plot of experimental data obtained regarding a vehicle having a damper mechanism arranged between the engine and the drivetrain.

In FIG. 9, the horizontal axis is configured such that the value of the third misfire parameter MISC is zero at a middle position, positive at positions to the right of the middle position, and negative at positions to the left of the middle position. The absolute value increases as one moves to the left or right from the middle position. Similarly, the vertical axis is configured such that the value of the second misfire parameter MISA is zero at a middle position, positive at positions above the middle position, and negative at positions below the middle position. The absolute value increases as one moves upward or downward from the middle position.

In a vehicle having a damper mechanism between the engine and the drivetrain, as shown in FIG. 9, the points determined by two misfire parameters MISA and MISC obtained for each cylinder are substantially distributed into five distinct groups, one large group that is distributed diagonally and four smaller groups that are also distributed diagonally. Of the four smaller groups G1, G2, G3 and G4 enclosed in ellipses, the three small groups G2, G3 and G4 located in upper left, lower left, and lower right positions correspond to cylinders for which data indicating misfiring was obtained even though the cylinders were not actually misfiring. The small group G1 located in an upper right position corresponds to a cylinder for which data indicating misfiring was obtained and the cylinder was actually misfiring. The remaining large group corresponds to cylinders for which data indicating misfiring was not obtained and the cylinder was did not misfire. The cylinders for which data indicating misfiring was obtained even though the cylinders were not actually misfiring are cylinders that were incorrectly determined (misdiagnosed) to have misfired. The cylinder for which data indicating misfiring was obtained and the cylinder was actually misfiring is a cylinder that was correctly determined to have misfired.

Based on FIG. 9, it can be seen that only cylinders corresponding to the small group G1 positioned in the upper right should be determined to be misfiring and the cylinders corresponding to the other three small groups G2, G3 and G4 (upper left, lower left, and lower right) should not be determined to be misfiring.

Therefore, the illustrated embodiment encloses the small group G1 in a triangle (indicated in FIG. 9 with a bold broken line) and to treat the enclosed region as a region in which misfiring occurs (misfire determination region). The apparatus then determines if a cylinder is misfiring by checking if the points determined by the two misfire parameters MISA and MISC of the cylinder lie within the misfire determination region. If the points determined by the two misfire parameters MISA and MISC of a cylinder lie within the misfire determination region, then the cylinder is determined to be misfiring. If the points determined by the two misfire parameters MISA and MISC of a cylinder do not lie within the misfire determination region, then the cylinder is determined not to be misfiring. The region in which misfiring occurs is approximated with a triangle comprising a vertical straight line, a diagonal straight line that rises to the right, and a horizontal straight line (three first degree equations).

It is good to use the point of the small group G1 having the smallest third misfire parameter MISC value as a third misfire parameter MISC value, i.e., a misfire determination threshold value, for determining the position of the vertical straight line. More specifically, among the third misfire parameter MISC values of the points forming the small group G1, the third misfire parameter MISC having the smallest value (e.g., A) and the third misfire parameter MISC having the largest value (e.g., B) are set as first and second misfire determination threshold values (determination values). If a third misfire parameter MISC value is larger than or equal to the first misfire determination threshold value A (=MCTH1) and smaller than or equal to the second misfire determination threshold value B (=MCTH2), then the third misfire parameter MISC value is within the misfire determination region. Meanwhile, if a third misfire parameter MISC value is smaller than the first misfire determination threshold value A (=MCTH1) or larger than the second misfire determination threshold value B (=MCTH2), then the third misfire parameter MISC value is not within the misfire determination region.

The straight line that rises to the right in FIG. 9 and contributes to demarcating the misfire determination region also serves as a misfire determination value (hereinafter called the "third misfire determination threshold value"). It is necessary to express the third misfire determination threshold value (determination value) using an equation expressing a relationship between the two misfire parameters MISA and MISC. Assuming the point where MISC=0 and MISA=0 is the origin, a straight line y that rises to the right can be expressed as shown below using the third misfire parameter MISC (indicated on the horizontal axis) as a variable.

$$y = MISC \times MACTHS + MACTHO \quad (9)$$

In the equations, MACTHS is a prescribed value expressing the slope of the line and MACTHO is a prescribed value expressing the y intercept.

When a third misfire parameter MISC is known, a value on the straight line y, i.e., a third misfire determination value, can be found by substituting the third misfire parameter MISC into the equation (9). More specifically, it can be determined if a point lies within the misfire determination region by substituting the third misfire parameter MISC coordinate of the point into the equation (9) to calculate a third misfire determination threshold value (=MCTH3) and comparing the second misfire parameter MISA coordinate of the point to the calculated third misfire determination threshold value MCTH3. If the second misfire parameter MISA coordinate is equal to or larger than the third misfire determination threshold value MCTH3, then the point is in the misfire determination region. Conversely, if the second misfire parameter MISA coordinate is smaller than the third misfire determination threshold value MCTH3, then the point is not in the misfire determination region.

In this way, an accurate determination as to whether or not a cylinder misfired can be obtained even in the case of a vehicle having a damper mechanism between the engine and the drivetrain by comparing the third misfire parameter MISC coordinate of each point to the first and second misfire determination threshold values and comparing the second misfire parameter MISA coordinate of each point to a third misfire determination threshold value MCTH3 obtained using the third misfire parameter MISC coordinate in the equation (9).

However, since a conventional apparatus conducts misfire determinations by merely comparing each of the misfire parameters MISA and MISC to a misfire determination threshold value, it cannot distinguish between the small group G1 and the other small groups G2, G3 and G4 shown in FIG. 9 and it makes incorrect misfire determinations.

Even in a vehicle that does not have a damper mechanism between the engine and the drivetrain, the time measurement values TINT can change and cause the waveform of the second and third misfire parameters MISA and MISC to be disturbed when the rotational speed of the engine output shaft fluctuates due to an external disturbance, such as a rotational speed fluctuation in the drive line caused by a poor road surface. Therefore, the illustrated embodiment can also be applied to a vehicle that does not have a damper mechanism between the engine and the drivetrain.

The characteristic shown in FIG. 9 is based on the engine running under constant operating conditions, i.e., at a prescribed engine load and a prescribed engine rotational speed. In a vehicle having a damper mechanism between the engine and the drivetrain, the effect of the damper mechanism on disturbing the waveform of the first and second misfire parameters (i.e., the way in which the first and second misfire parameters are disturbed) will change if the engine load and engine rotational speed (i.e., engine operating conditions) change. Likewise, in a vehicle not having a damper mechanism between the engine and the drivetrain, the effect of rotation fluctuations imparted from the drivetrain due to poor road surfaces on the waveform of the first and second misfire parameters (i.e., the way in which the first and second misfire parameters are disturbed) will change if the engine load and engine rotational speed (i.e., engine operating conditions) change. More specifically, the position of the straight line rising to the right (third misfire determination threshold value) and, thus, the values of the aforementioned constants MACTHS and MACTHO, will change if the engine load and engine rotational speed change.

Figure 10:
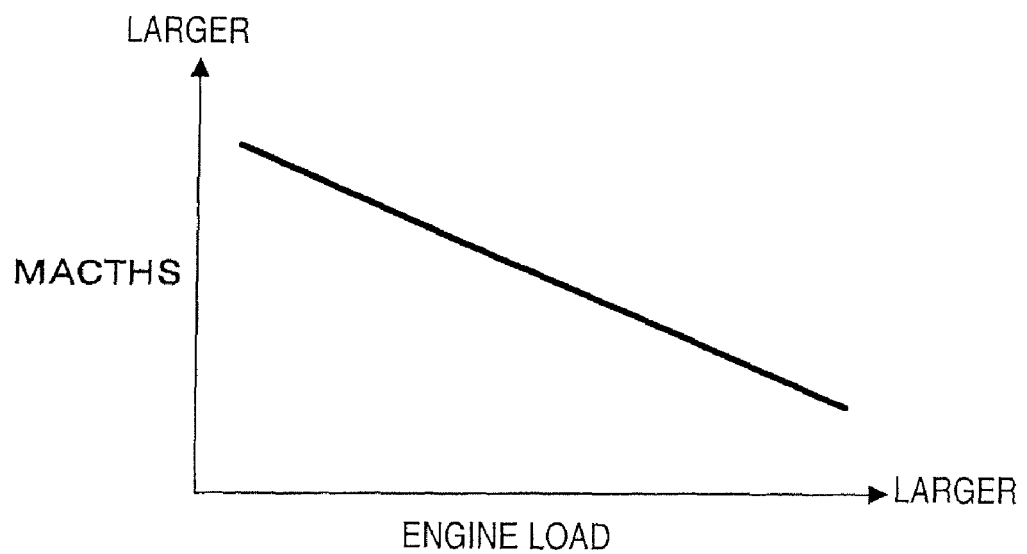
FIG. 10 is a characteristic diagram of a prescribed value MACTHS.
Figure 11:
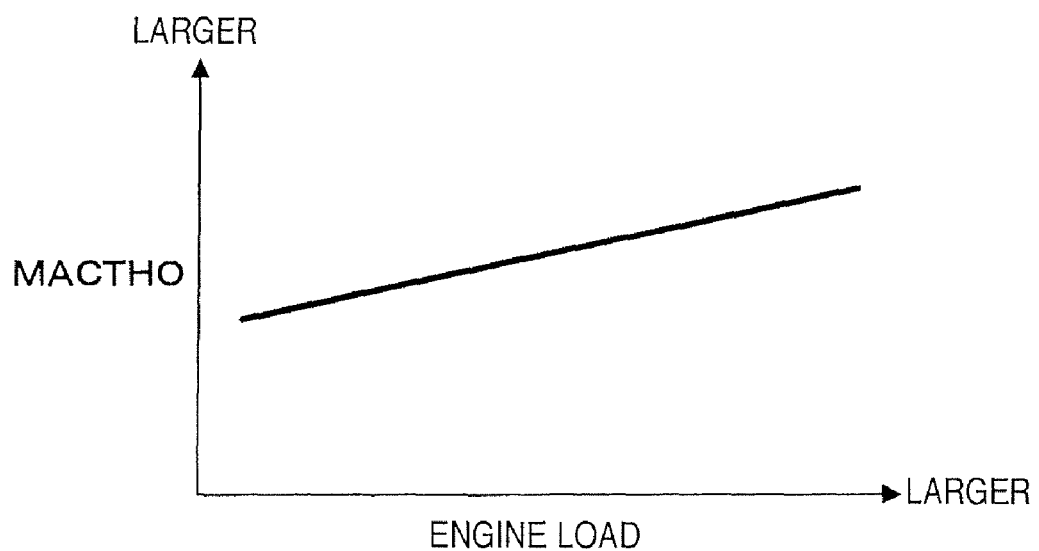
FIG. 11 is a characteristic diagram of a prescribed value MACTHO.

Therefore, a sampling of the second misfire parameter MISA, the third misfire parameter MISC, and the misfire determination result was conducted with respect to each cylinder of the engine 1 with the engine 1 running under various operating conditions, i.e., different engine loads and engine rotational speeds. The sampling results for each cylinder were plotted on graphs as points comprising a second misfire parameter MISA coordinate and a third misfire parameter MISC coordinate. The graphs were constructed such that values of the third misfire parameter MISC are indicated on a horizontal axis and the values of the second misfire parameter MISA are indicated on a vertical axis. The resulting graphs were analyzed to determine the position of the diagonally rightward-rising line (third misfire determination threshold value) of each graph and the constant terms (MACTHS and MACTHO) of the same line of each graph. Characteristic curves for the constant terms obtained from the analysis are shown in FIGS. 10 and 11. FIG. 10 is a plot of the prescribed value MACTHS versus the engine load and indicates that the prescribed value MACTHS decreases as the engine load increases. FIG. 11 is a plot of the prescribed value MACTHO versus the engine load and indicates that the prescribed value MACTHO increases as the engine load increases. In FIGS. 10 and 11, the engine load is indicated on the horizontal axis, but a similar characteristic can be obtained by indicating the rotational speed on the horizontal axis. Furthermore, the illustrated embodiment is not limited to using plots like those shown in FIGS. 10 and 11; it is also acceptable to form a map of the constant terms MACTHS and MACTHO using the engine load and engine rotational speed as parameters.

Thus, even though the external disturbances imparted to the engine output shaft during operation or non-operation of a damper mechanism in a vehicle having a damper mechanism between the engine and the drivetrain (or the external disturbances imparted to the engine output shaft due to traveling on a poor road surface in a vehicle not having a damper mechanism between the engine and the drivetrain) differ depending on differences in the engine load and the engine rotational speed, those differences can be accommodated by storing the constant terms MACTHS and MACTHO of the straight line y in a memory inside the engine control unit 7 in the form of a table that uses the engine load (or the engine load and engine rotational speed) as a parameter. In this way, an accurate misfire determination can be ensured throughout the entire load region of the engine (or the entire operating region if the table takes into account both the engine load and the engine rotational speed).

A control executed by the engine control unit 7 in order to calculate the misfire parameters and determine if misfiring has occurred will now be explained with reference to flowcharts.

Figure 12:
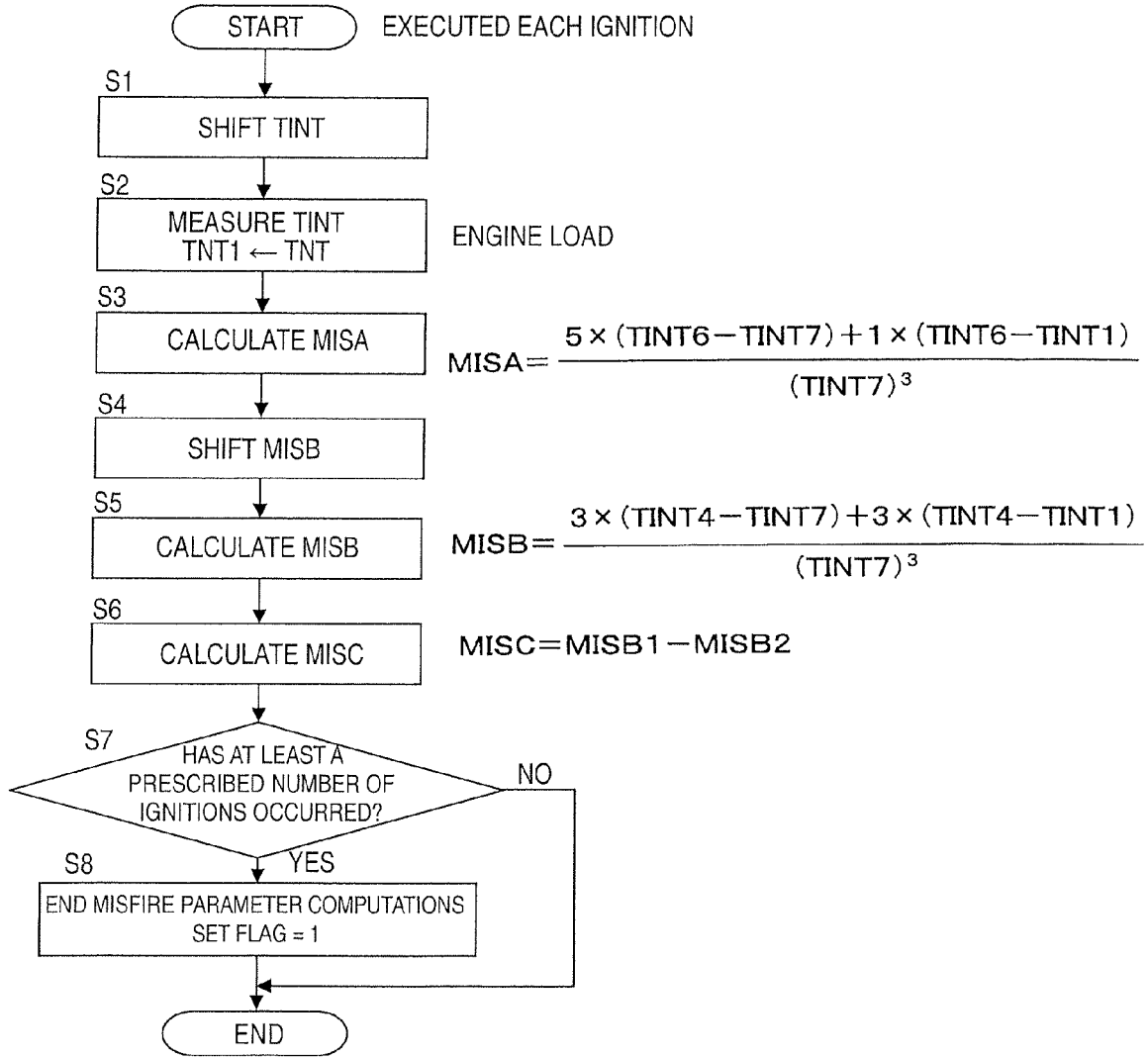
FIG. 12 is a flowchart for explaining a calculation of a misfire parameter.

FIG. 12 is a flowchart showing a control that serves to calculate the misfire parameters and is executed once per ignition. In actual practice, the misfire parameters are calculated separately for each cylinder and a separate determination is conducted to check if each cylinder is misfiring based on the calculated misfire parameters. However, since the calculation method is the same regardless of which cylinder is checked, the following explanation does not distinguish among the cylinders.

In step S1, the engine control unit 7 shifts each of the old time measurement values TINT stored in a RAM (internal memory of the engine control unit 7) one position toward a previous value. More specifically, the engine control unit 7 shifts the data corresponding to the immediately previous ignition to a location in the RAM corresponding to two ignitions prior, shifts the data corresponding to three ignitions prior to a location corresponding to four ignitions prior, and so on until it shifts the data corresponding to six ignitions prior to a location corresponding to seven ignitions prior.

Then in step S2, the engine control unit 7 conducts a new measurement of a time measurement value TINT and sets the measured value as the time measurement value TINT1. The duration over which the time measurement value TINT is measured starts at a point in time when a ring gear position signal (Pos signal) has been counted a prescribed number of times after receiving a reference signal (Ref signal) from the crank angle sensor 6 and ends when the next reference signal is received.

In step S3, the engine control unit 7 uses the time measurement values TNT1, TNT6, and TNT7 to calculate a second misfire parameter MISA using the previously described equation (7).

In step S4, the engine control unit 7 shifts the old value of the first misfire parameter MISB as will now be explained.

$$MISB2(\text{new}) \leftarrow MISB1(\text{old})$$

$$MISB1(\text{new}) \leftarrow MISB(\text{old})$$

In step S5, the engine control unit 7 calculates the latest (new) first misfire parameter MISB using the previously described equation (3).

In step S6, the engine control unit 7 uses the values of the first misfire parameters MISB2 and MISB1 resulting after shifting in the aforementioned equation (8) to calculate a third misfire parameter MISC.

In step S7, the engine control unit 7 determines if at least a prescribed number of ignitions have occurred since the misfire determination was permitted. If so, then the engine control unit 7 proceeds to step S8 and sets the value of a flag serving to indicate if computation of all the misfire parameters has ended to 1 (the default value of the flag is 0). The engine control unit 7 then ends the control loop shown in FIG. 12.

Figure 13:
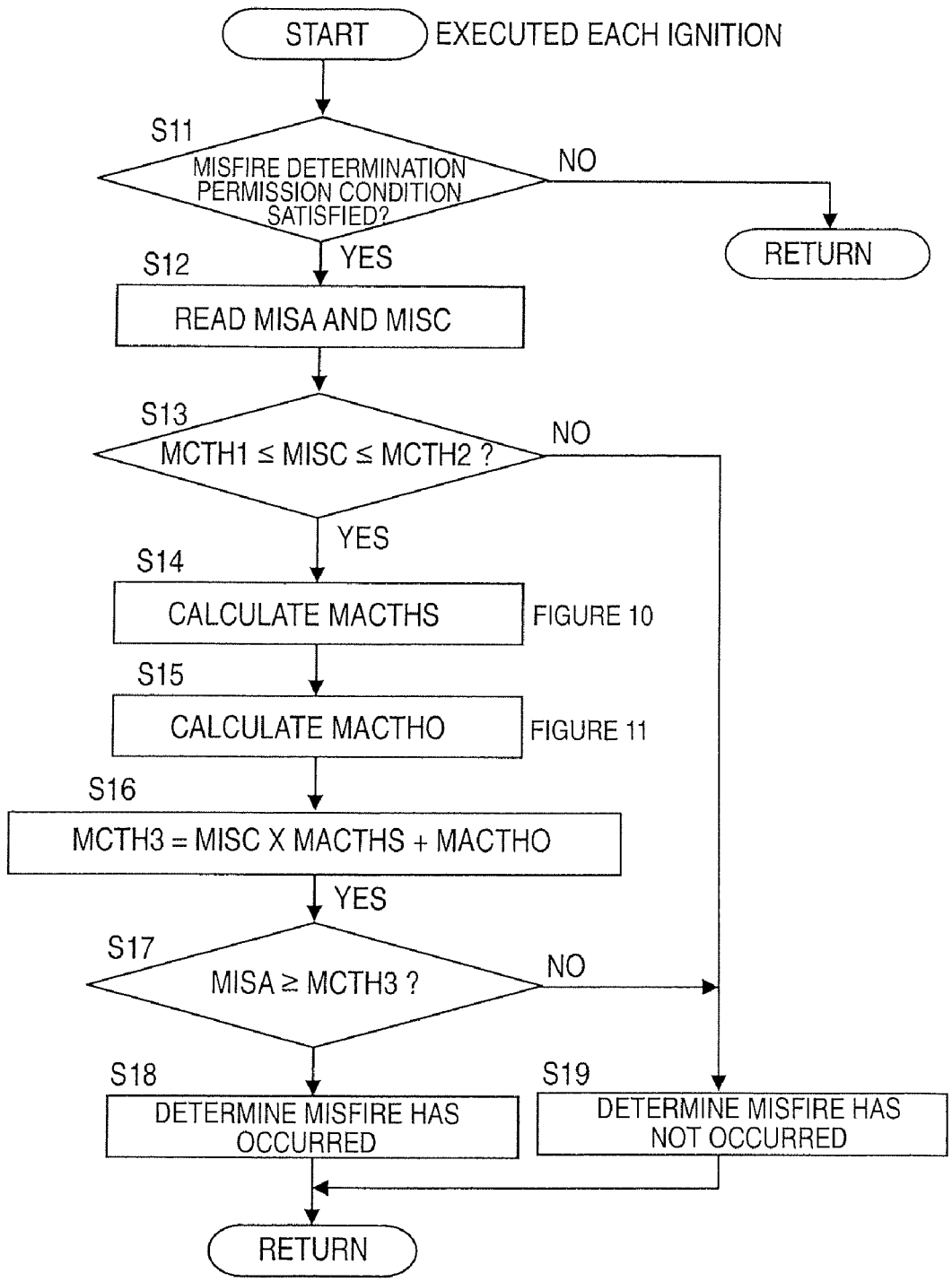
FIG. 13 is a flowchart for explaining a misfire determination.

The control shown in the flowchart of FIG. 13 is executed once per ignition and constitutes a misfire determination. A condition for executing the flowchart of FIG. 13 is that the calculations of the misfire parameters MISA, MISB, and MISC shown in FIG. 12 have ended.

In step S11, the engine control unit 7 determines if a misfire determination permission condition is satisfied. The misfire determination permission condition is satisfied when a diagnosis permission condition is satisfied and a prescribed number of ignitions has occurred since the diagnosis permission condition was satisfied (i.e., since a diagnosis was permitted). When the misfire determination permission condition is satisfied, the engine control unit 7 proceeds to step S12.

In step S12, the engine control unit 7 reads in the second and third misfire parameters MISA and MISC (calculation completed in FIG. 12) for the cylinder-in-question. In step S13, the engine control unit 7 compares the third misfire parameter MISC to the first and second misfire determination threshold values MCTH1 and MCTH2 (MCTH2>MCTH1). If the third misfire parameter MISC is smaller than the first misfire determination threshold value MCTH1 or larger than the second misfire determination threshold value MCTH2, then the engine control unit 7 determines that the cylinder-in-question is not in the misfire determination region and proceeds to step S19. In step S19, the engine control unit 7 determines that the cylinder-in-question did not misfire and ends the control loop of FIG. 13.

If the engine control unit 7 determines in step S13 that the third misfire parameter MISC is equal to or larger than the first misfire determination threshold value MCTC1 and equal to or smaller than the second misfire determination threshold value MCTH2, then the engine control unit 7 determines that the cylinder-in-question is possibly in the misfire determination region and proceeds to execute step S14 and subsequent steps.

In step S14, the engine control unit 7 calculates the prescribed value MACTHS by searching a table compiling the content shown in FIG. 10 based on the engine load.

In step S15, the engine control unit 7 calculates the prescribed value MACTHO by searching a table compiling the content shown in FIG. 11 based on the engine load.

In step S16, the engine control unit 7 uses the equation shown below to calculate a third misfire determination threshold value MCTH3 using the prescribed values MACTHS and MACTHO and the third misfire parameter MISC calculated in step S12.

$$MCTH3 = MISC \times MACTHS + MACTHO \qquad (10)$$

The equation (10) presented here is basically the same as the previously presented equation (9).

In step S17, the engine control unit 7 compares the second misfire parameter MISA obtained in step S12 to the third misfire determination threshold value MCTH3. If the second misfire parameter MISA is equal to or larger than the third misfire determination threshold value MCTH3, then the engine control unit 7 proceeds to step S18 and determines that the cylinder-in-question did misfire. If the second misfire parameter MISA is smaller than the third misfire determination threshold value MCTH3, then the engine control unit 7 proceeds to step S19 and determines that the cylinder-in-question is not in the misfire determination region, i.e., that the cylinder did not misfire. The engine control unit 7 then ends the control loop shown in FIG. 13.

Operational effects of the embodiment will now be explained.

As explained above, the engine misfire diagnostic apparatus is configured (programmed) to do the following: measure an amount of time required for the crankshaft 2 of the engine 1 to pass through a prescribed crank angle range corresponding to a combustion stroke on a per cylinder basis based a signal from the magnetic pickup 5 (which serves as a sensor contrived to detect a rotational position of the crankshaft) (see step S1 of FIG. 12); store the time measurement value measured on a per-cylinder basis during each ignition (see step S2 of FIG. 12); calculate a first misfire parameter MISB based on a value obtained by adding a difference between a stored time measurement value for a misfired cylinder and a stored time measurement value for an opposing cylinder corresponding to one crankshaft rotation prior and a difference between a stored time measurement value of a misfired cylinder and a stored time measurement value of an opposing cylinder corresponding to one crankshaft rotation later (see step S5 of FIG. 12); calculating a second misfire parameter MISA based on a value obtained by adding a difference between a stored time measurement value of a misfired cylinder and a stored time measurement value of a cylinder whose ignition occurs one ignition prior and a difference between a stored time measurement value of a misfired cylinder and a stored time measurement value of a current cylinder, said differences being weighted according to a prescribed ratio (e.g., in the case of a six cylinder engine, the difference between a stored time measurement value of a misfired cylinder and a stored time measurement value of a cylinder whose ignition occurs one ignition prior might be weighted at 5 to 1 with respect to the difference between a stored time measurement value of a misfired cylinder and a stored time measurement value of a current cylinder) (see step S3 of FIG. 12); calculate a third misfire parameter MISC that is a derivative value of the first misfire parameter MISB (see steps 4 and 6 of FIG. 12); set a third misfire determination threshold value MCTH3 (determination value) using a mathematical relationship between the second misfire parameter MISA and the third misfire parameter MISC (see step S16 of FIG. 13); and determine if a cylinder-in-question has misfired based on the third misfire determination threshold value MCTH3 (see step S17 of FIG. 13). As a result, this embodiment can be accurately determined if a cylinder has misfired even when an external disturbance has been imparted to the engine output shaft and caused a time measurement value to change and the waveforms of the first and second misfire parameters MISA and MISC to be distorted.

This embodiment is configured to change the constant terms MACTHS and MACTHO of the diagonally rightward-rising straight line (first degree expression that serves to determine the third misfire determination threshold value) in accordance with the operating conditions of the engine (see FIGS. 10 and 11 and steps S14 and S15 of FIG. 13). As a result, even if the manner in which the waveforms of the second and third misfire parameters MISA and MISC are disturbed changes depending on the engine operating conditions, an accurate determination can be made as to whether or not a cylinder has misfired.

Although the embodiment is explained using FIG. 9, in which the third misfire parameter MISC is indicated on a horizontal axis and the second misfire parameter MISA is indicated on a vertical axis, it is also acceptable for the second misfire parameter MISA to be indicated on a horizontal axis and the third misfire parameter MISC to be indicated on a vertical axis.

Although the embodiment is explained based on a six cylinder engine, the invention is not limited to a six cylinder engine and it can be applied to, for example, a four cylinder engine or an eight cylinder engine. In the case of a four cylinder engine, the first and second misfire parameters MISB and MISA are calculated as shown below and the third misfire parameter MISC can be found based on the first misfire parameter MISB using the aforementioned equation (8), taking into consideration the number of cylinders and a comparison of the ignition intervals corresponding to the prior adjoining cylinder within two distinct crank rotations.

$$MISB = [2(TINT5 - TINT7) + 2(TINT5 - TINT3)] / (TINT7)^3 \qquad (11)$$

$$= 2[(TINT5 - TINT7) + (TINT5 - TINT3)] / (TINT7)^3 \qquad (11a)$$

$$MISA = [3(TINT6 - TINT7) + 1 \times (TINT6 - TINT3)] / (TINT7)^3 \qquad (12)$$

The function of the time measuring section mentioned above is realized with step S1 of FIG. 12. The function of the time measurement value storing section is realized with step S2 of FIG. 12. The function of the first misfire parameter calculating section is realized with step S5 of FIG. 12. The function of the second misfire parameter calculating section is realized with step S3 of FIG. 12. The function of the third misfire parameter calculating section is realized with steps S4 and S6 of FIG. 12. The function of the determination value setting section is realized with step S16 of FIG. 13. The function of the misfire determining section is realized with step S17 of FIG. 13.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An engine misfire diagnostic apparatus comprising:
   a sensor arranged to detect a rotational position of a crankshaft provided in an engine;
   a time measuring section that measures an amount of time required for a crankshaft to pass through a prescribed crank angle range corresponding to a combustion stroke based on a signal from the sensor to obtain time measurement values on a per cylinder basis;
   a time measurement value storing section that stores the time measurement values measured by the time measuring section for each ignition on a per-cylinder basis;
   a first misfire parameter calculating section that calculates a first misfire parameter based on a first value obtained by adding a difference between a stored time measurement value for a designated cylinder and a stored time measurement value for an opposing cylinder corresponding to one crankshaft rotation prior and a difference between the stored time measurement value for the designated cylinder and a stored time measurement value for the opposing cylinder corresponding to one crankshaft rotation later with respect to the one crankshaft rotation prior of the opposing cylinder;
   a second misfire parameter calculating section that calculates a second misfire parameter based on a second value obtained by adding a difference between the stored time measurement value for the designated cylinder and a stored time measurement value of a first reference cylinder whose ignition occurs one ignition prior to an ignition of the designated cylinder and a difference between the stored time measurement value of the designated cylinder and a stored time measurement value of a second reference cylinder whose ignition occurs later than the ignition of the designated cylinder, the differences being weighted according to a prescribed ratio;
   a determination value setting section that sets a determination value using a mathematical relationship between the second misfire parameter and a derivative value of the first misfire parameter; and
   a misfire determining section that determines whether the designated cylinder has misfired based on the determination value.

2. The engine misfire diagnostic apparatus as recited in claim 1, wherein
   the misfire determining section further determines that the designated cylinder has misfired when the determination value is within a prescribed region on a two-dimensional graph having the derivative value of the first misfire parameter and the second misfire parameter as two axes of the two-dimensional graph, with the prescribed region being set based on a first degree formulaic relationship having the derivative value of the first misfire parameter as a variable.

3. The engine misfire diagnostic apparatus as recited in claim 2, wherein
   the determining section further changes a constant term of the first degree formulaic relationship according to an operating condition of the engine to be diagnosed.

4. The engine misfire diagnostic apparatus as recited in claim 3, wherein
   the determining section further establishes the first degree formulaic relationship as a relationship in which a misfire determination threshold value is expressed as a first degree expression obtained by adding a second prescribed value to a product of a first prescribed value and a derivative value of the first misfire parameter, with the first prescribed value being set such that the first prescribed value decreases as the engine load increases.

5. The engine misfire diagnostic apparatus as recited in claim 3, wherein
   the determining section further establishes the first degree formulaic relationship as a relationship in which a misfire determination threshold value is expressed as a first degree expression obtained by adding a second prescribed value to a product of a first prescribed value and a derivative value of the first misfire parameter, the second prescribed value being set such that the second prescribed value increases as the engine load increases.

6. The engine misfire diagnostic apparatus as recited in claim 1, wherein
   the second reference cylinder is the cylinder corresponding to a most recent stored time measurement value.

7. The engine misfire diagnostic apparatus as recited in claim 1, wherein
   the second reference cylinder is the cylinder whose ignition occurred latest during calculation of the second misfire parameter.

8. The engine misfire diagnostic apparatus as recited in claim 1, wherein
   the first and second reference cylinders are the same cylinder within two distinct crank rotations.

9. An engine misfire diagnostic method comprising:
   measuring an amount of time required for a crankshaft of an engine to pass through a prescribed crank angle range corresponding to a combustion stroke on a per-cylinder basis based on a rotational position of the crankshaft to obtain time measurement values;
   storing the time measurement values during each ignition on a per-cylinder basis;
   calculating a first misfire parameter based on a first value obtained by adding a difference between a stored time measurement value of a designated cylinder and a stored time measurement value of an opposing cylinder corresponding to one crankshaft rotation prior and a difference between the stored time measurement value of the designated cylinder and a stored time measurement value of an opposing cylinder corresponding to one crankshaft rotation later with respect to the one crankshaft rotation prior;

calculating a second misfire parameter based on a second value obtained by adding a difference between the stored time measurement value of the designated cylinder and a stored time measurement value of a first reference cylinder whose ignition occurs one ignition prior to an ignition of the second misfired cylinder and a difference between the stored time measurement value of the designated cylinder and a stored time measurement value of a second reference cylinder whose ignition occurs later than the ignition of the designated cylinder, the differences being weighted according to a prescribed ratio;

setting a determination value using a mathematical relationship between the second misfire parameter and a derivative value of the first misfire parameter;

determining whether a cylinder-in-question has misfired based on the determination value.

10. The engine misfire diagnostic method as recited in claim 9, wherein the determining of whether the designated cylinder has misfired is determined based on when the determination value is within a prescribed region on a two-dimensional graph having the derivative value of the first misfire parameter and the second misfire parameter as two axes of the two-dimensional graph, with the prescribed region being set based on a first degree formulaic relationship having the derivative value of the first misfire parameter as a variable.

11. The engine misfire diagnostic method as recited in claim 10, wherein the determining of whether the designated cylinder has misfired further includes changing a constant term of the first degree formulaic relationship according to an operating condition of the engine to be diagnosed.

12. The engine misfire diagnostic method as recited in claim 11, wherein the determining of whether the designated cylinder has misfired further includes establishing the first degree formulaic relationship as a relationship in which a misfire determination threshold value is expressed as a first degree expression obtained by adding a second prescribed value to a product of a first prescribed value and a derivative value of the first misfire parameter, with the first prescribed value being set such that the first prescribed value decreases as the engine load increases.

13. The engine misfire diagnostic method as recited in claim 11, wherein the determining of whether the designated cylinder has misfired further includes establishing the first degree formulaic relationship as a relationship in which a misfire determination threshold value is expressed as a first degree expression obtained by adding a second prescribed value to a product of a first prescribed value and a derivative value of the first misfire parameter, the second prescribed value being set such that the second prescribed value increases as the engine load increases.

14. The engine misfire diagnostic method as recited in claim 9, wherein the calculating of the second misfire parameter uses a cylinder corresponding to a most recent stored time measurement value as the second reference cylinder.

15. The engine misfire diagnostic method as recited in claim 9, wherein the calculating of the second misfire parameter uses a cylinder whose ignition occurred latest during calculation of the second misfire parameter as the second reference cylinder.

16. The engine misfire diagnostic apparatus as recited in claim 9, wherein the calculating of the second misfire parameter uses the same cylinder within two distinct crank rotations as the first and second reference cylinders.

* * * * *